No. 751,235. PATENTED FEB. 2, 1904.
E. W. WICKEY.
AUTOMOBILE.
APPLICATION FILED FEB. 24, 1903.
NO MODEL. 2 SHEETS—SHEET 1.
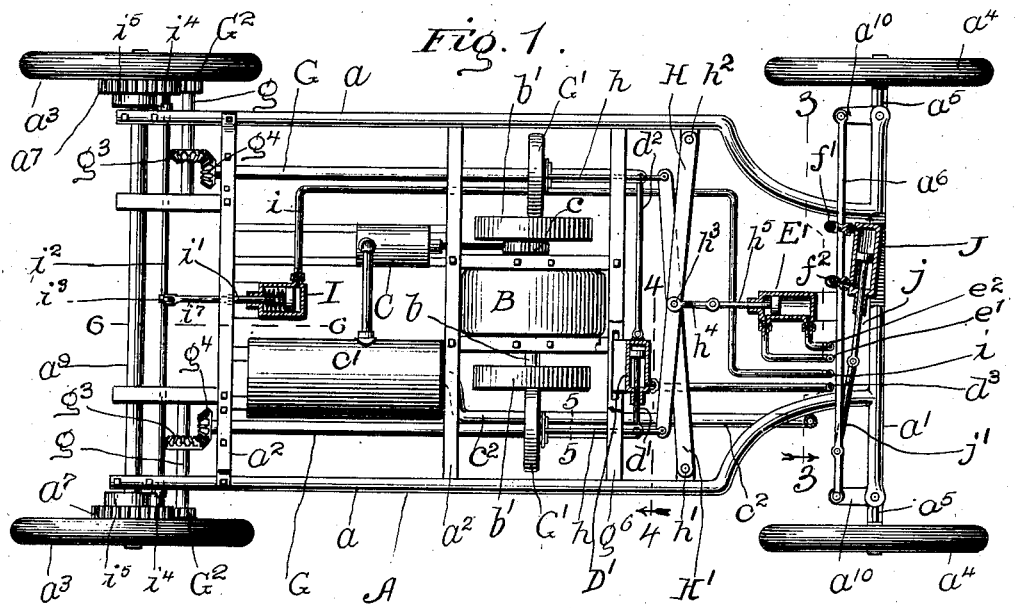
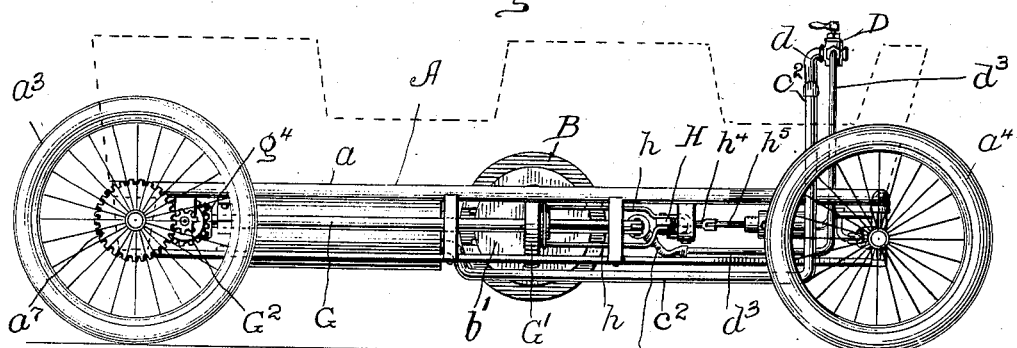
Witnesses: Inventor:
Russell Wiler Edward W. Wickey
Chas. O. Shervey by H. F. Bitner, Atty.

No. 751,235. PATENTED FEB. 2, 1904.
E. W. WICKEY.
AUTOMOBILE.
APPLICATION FILED FEB. 24, 1903.
NO MODEL. 2 SHEETS—SHEET 2.
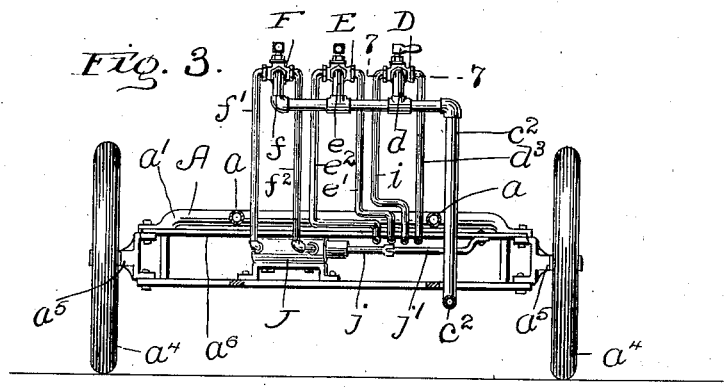
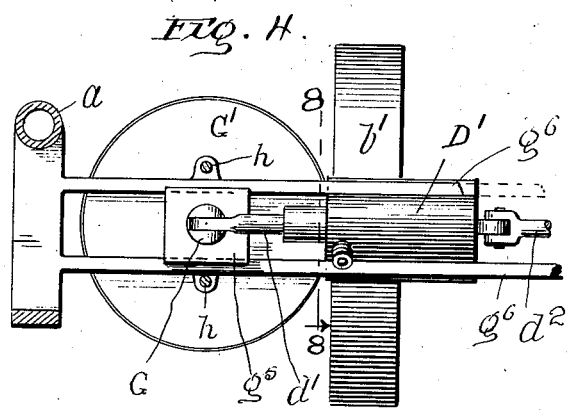
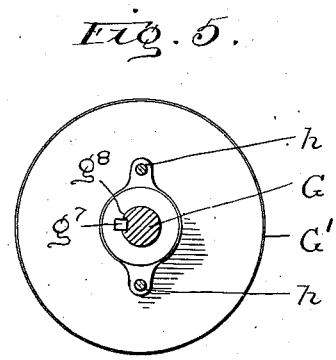
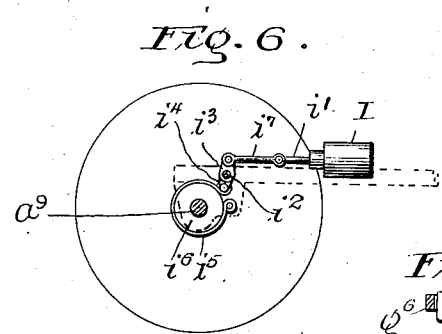
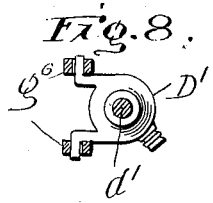
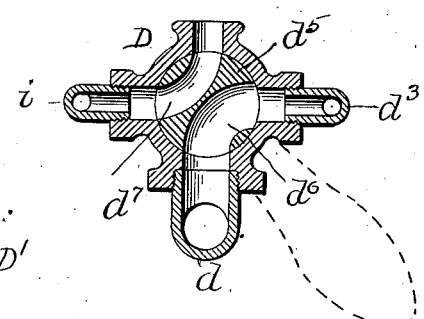
Witnesses:
Russell Wiles
Chas O Shurvey
Inventor:
Edward W. Wickey
by H P Bitner
Atty.

No. 751,235. Patented February 2, 1904.

UNITED STATES PATENT OFFICE.

EDWARD W. WICKEY, OF EAST CHICAGO, INDIANA.

AUTOMOBILE.

SPECIFICATION forming part of Letters Patent No. 751,235, dated February 2, 1904.

Application filed February 24, 1903. Serial No. 144,562. (No model.)

*To all whom it may concern:*

Be it known that I, EDWARD W. WICKEY, a citizen of the United States of America, residing at East Chicago, in the county of Lake and State of Indiana, have invented certain new and useful Improvements in Automobiles, of which the following is a specification.

My invention relates to certain new and useful improvements in automobiles, the object being to produce an automobile in which the devices for controlling the power, speed, braking, and steering mechanisms are operated by means of a fluid under pressure—as, for instance, compressed air, steam, or the like; and to such end it consists in certain novel features of construction and arrangement, a description of which will be found in the following specification.

The invention is illustrated in the drawings furnished herewith by means of eight figures, of which—

Figure 1 is a plan view of the automobile, the body of which is not shown, and the cylinders which actuate the various mechanisms for controlling the machine being shown in diametrical horizontal section. Fig. 2 is a side view of the parts seen in Fig. 1, the body being indicated in dotted lines. Fig. 3 is a vertical cross-section in the line 3 3 of Fig. 1. Fig. 4 is a detail view of the speed-controlling mechanism, the view being in elevation and the frame of the machine being cut away in the line 4 4 of Fig. 1. Fig. 5 is a detail elevation of a friction-disk, the shaft being cut away in the line 5 5 of Fig. 1. Fig. 6 is a side view illustrating the brake-cylinder and mechanisms operating therewith, the rear shaft being shown in cross-section, the line of section being indicated at 6 6 in Fig. 1. Fig. 7 is a detail horizontal section of one of the valves controlling the pressure, the line of section being indicated at 7 7 of Fig. 3; and Fig. 8 is a detail vertical longitudinal section taken in the line 8 8 of Fig. 4.

Referring to the drawings, A represents the frame of the running-gear, which is shown as consisting of longitudinal members $a$ and transverse members $a^2 a^2$. The rear wheels $a^3$ are mounted on an axle $a^9$, and the steering-wheels $a^4$ are journaled upon spindles $a^5$, pivoted to the transverse members $a'$, said spindles being provided with arms $a^{10}$, connected together by means of a connecting-rod $u^6$, whereby both of said wheels may be oscillated bodily upon the pivots of the spindles $a^5$. A suitable motor B is supported upon the frame of the running-gear and may be of any of the well-known types of motors used upon automobiles—as, for instance, electric, gas, or steam—and the shaft $b$ of said motor carries upon its ends comparatively heavy friction fly-wheels $b'$.

The rear wheels $a^3$ are the traction-wheels and are provided with gears $a^7$, in mesh with pinions $G^2$, fast upon counter-shafts $g$, journaled in suitable bearings upon the frame of the machine, said shafts having secured upon them bevel-gears $g^3$, in mesh with similar gears $g^4$, fast upon longitudinally-extending shafts G. The shafts G are journaled in suitable bearings at their ends bearing the bevel-gears $g^4$ and in slidable bearings $g^5$ (see Fig. 4) at their other ends, said bearings $g^5$ being mounted on the frame of the machine. Upon the shafts G are slidably mounted friction-pinions G′, said friction-pinions being provided with splines $g^7$, running in grooves $g^8$ in the shaft, thereby making the friction-pinions non-rotatable with respect to the shafts. The friction-pinions are moved along said shafts by means of links $h$, which are connected to the free ends of levers H H′, said levers being pivoted to the frame of the machine at $h'$, $h^2$ and to each other at $h^3$ by means of a clevis $h^4$, said clevis being in turn connected to the piston-rod $h^5$ of a cylinder E′. It will be clearly understood that by reciprocating the piston-rod $h^5$ the levers H H′ are oscillated upon their pivots, consequently moving the friction-pinions G′ longitudinally upon the shafts G. The forward ends of the shafts G are connected to rods $d'$ $d^2$, the other end of the rod $d^2$ being in turn secured upon a movable cylinder D′, slidably mounted upon the bars $g^6$ of the frame of the machine, (see Fig. 4,) and the rod $d'$ being the piston-rod of said cylinder D′. It is obvious that when the forward ends of the shafts G are moved toward each other the friction-pinions G′ will be brought into contact with the fly-wheels $b'$ of the engine and rotated thereby, except, of course, when directly upon the axis of rotation thereof.

A pump or compressor C is supported on the running-gear and connected to the shaft of the motor by suitable operating mechanism—as, for instance, by an eccentric c, as shown in Fig. 1 of the drawings. This pump is adapted to keep a continual supply of compressed air in a reservoir $c'$. A lead pipe $c^2$ conveys the compressed air to the various valves for operating the running mechanism of the automobile. As shown in Figs. 2 and 3, the pipe $c^2$ extends upward across the front end of the machine and connects with three valves D E F by means of short nipples $d\ e\ f$.

The valves D E F may be what are termed "four-way cocks" and are adapted to direct the flow of compressed air from the reservoir to the various cylinders to operate the speed-controlling mechanism, brake and steering mechanisms, respectively. From the valve D extends a pipe $d^3$, which connects with the power-controlling cylinder D' by means of a flexible tube $d^4$, (see Fig. 2,) the inlet-port to this cylinder being on that side of the piston-head which when the compressed air enters said cylinder will draw the two forward ends of the shafts G together, thereby bringing the pinions G' into frictional engagement with the fly-wheels $b'$ of the motor. A second pipe $i$ leads from the valve D and extends to the brake-cylinder I, (see Fig. 1,) which contains the usual piston head and rod $i'$, spring-pressed in a direction opposite to that which the compressed air forces the piston, said piston-rod being connected to a rock-shaft $i^2$ by means of a link $i'$ and crank $i^3$, the crank being fast upon the rock-shaft $i^2$. (See Fig. 6.) The rock-shaft bears upon its ends arms $i^4$, connected to straps $i^5$, encircling suitable brake-drums $i^6$, connected to the traction-wheels $a^3$ of the machine. When the compressed air is turned into the cylinder I, it moves the piston back, turning the rock-shaft and tightening the straps upon the brake-drums. When the air-pressure is relieved, the spring naturally returns the piston to its normal position, releasing the brakes.

Fig. 7 shows a detail view of one of the controlling-valves, where it is shown as containing a plug $d^5$, having two passage-ways $d^6\ d^7$. The passage-way $d^6$ controls the flow of compressed air from the reservoir to either of the other two pipes $d^3\ i$, leading from the valve, while the passage-way $d^7$ is adapted to connect either of said pipes with the open air. As shown, the position of this brake is that in which communication is established between the reservoir and the power-cylinder D', while the pipe $i$, leading from the brake-cylinder, communicates with the atmosphere through the passage $d^7$. In other words, the compressed air acts upon the cylinder D', holding the friction-pinions G' in frictional engagement with the fly-wheels of the motor, while the brakes remain released. When it is desired to stop the machine, the plug is turned into the position wherein the passage $d^6$ connects the air-reservoir with the brake-cylinder, thereby applying the brakes and relieving the pressure within the cylinder D' through the medium of the passage-way $d^7$ of the plug.

The valves E and F may be of a type similar to the one indicated in Fig. 7, the pipes leading therefrom, however, running to the speed-controlling cylinder E' and steering mechanism, respectively. These pipes leading from the valve E are lettered $e'\ e^2$ and run to the opposite ends of the cylinder E'. In this way the compressed air may be turned in on either side of the piston to move the friction-pinions on their shafts. When the handle of the valve E is turned to the right, compressed air will be admitted to the cylinder E' by means of the pipe $e'$, (see Fig. 1,) thereby moving the friction-pinions G' toward the periphery of the fly-wheels, and thereby increasing the speed of the machine. When the handle of the valve is moved toward the left, the compressed air is admitted on the opposite side of the piston and the friction-disks moved back of the center of the fly-wheels, reversing the direction of the driven shafts.

The valve F controls the steering mechanism in like manner, the pipes $f^2\ f'$ leading from the valve to the steering-cylinder J, which contains a piston and piston-rod $j$, which is connected to the bar $a^6$ of the steering-wheel by means of a link $j''$. It is obvious that when compressed air is turned in on one side of the piston it will swing the wheels upon the pivots of their supporting-yokes in one direction, and when compressed air is admitted on the opposite side of the cylinder it will swing them in the opposite direction.

In the operation of the machine the handle of the valve D is turned toward the right, thereby admitting compressed air into the power-cylinder D', drawing the friction-pinions G' into contact with the fly-wheels of the motor. The speed of the machine may then be regulated by means of the valve E and the machine guided by means of the valve F.

I claim as new and desire to secure by Letters Patent—

1. In an automobile, the combination with the frame and wheels, of shafts journaled in said frame and geared to the traction-wheels, a motor, fly-wheels rotated thereby, friction-pinions upon said shafts, an air-cylinder connected to the free ends of said shafts adapted when compressed air is admitted thereto to draw said friction-pinions into frictional engagement with the fly-wheels of the motor, substantially as described.

2. In an automobile, the combination with a frame and wheels, of shafts geared to the traction-wheels thereof, a motor and fly-wheels rotated thereby, friction-pinions upon said shafts in frictional engagement with the fly-wheels, a compressed-air cylinder, a piston therein and suitable means of connection between said piston and the friction-pinions, whereby the movement of the piston within the air-cylinder moves the friction-pinions across the face of the fly-wheels to regulate the speed, substantially as described.

3. In an automobile, the combination with a frame and wheels, of shafts geared to the traction-wheels thereof, a motor and fly-wheels rotated thereby, friction-pinions upon said shafts in frictional engagement with the fly-wheels, a compressed-air cylinder and piston-rod reciprocating therein, levers pivoted upon the frame of the machine and connected to said piston-rod, connecting-rods between the free ends of said levers and the friction-pinions, whereby the movement of said piston-rod within the cylinder is adapted to vary the speed of the traction-wheels, substantially as described.

4. In an automobile, the combination with a suitable frame and wheels journaled thereupon, of a shaft geared to one of the traction-wheels, a motor, a fly-wheel rotated thereby, a pinion upon said shaft, a compressed-air cylinder connected to said shaft to hold the pinion in frictional engagement with the fly-wheel, suitable brake mechanism, a compressed-air cylinder for operating said mechanism, a compressed-air reservoir, and a valve controlling the supply of air from the reservoir to the friction-cylinder and the brake-cylinder, by which air may be alternatively admitted to either of said cylinders, substantially as described.

5. In an automobile, the combination with a suitable frame and traction-wheels, of a shaft geared to one of the traction-wheels, a motor and fly-wheel rotated thereby, a pinion upon said shaft, a compressed-air cylinder connected to said shaft to hold the pinion in frictional engagement with the fly-wheel, suitable brake mechanism, a compressed-air cylinder for operating said mechanism and a suitable cock interposed between the friction-cylinder and brake-cylinder adapted, when compressed air is admitted to either of said cylinders, to establish communication between the other cylinder and the open air, substantially as described.

In witness whereof I have signed the above application for Letters Patent, at Chicago, in the county of Cook and State of Illinois, this 18th day of February, A. D. 1903.

EDWARD W. WICKEY.

Witnesses:
RUSSELL WILES,
CHAS. O. SHERVEY.